United States Patent
Nguyen et al.

(10) Patent No.: US 6,216,182 B1
(45) Date of Patent: Apr. 10, 2001

(54) METHOD AND APPARATUS FOR SERVING DATA WITH ADAPTABLE INTERRUPTS

(75) Inventors: Nhiem Nguyen, Cranberry; Michael H. Benson, New Castle; Steven J. Schlick, Wexford; George Totolos, Jr., Cranberry, all of PA (US)

(73) Assignee: Fore Systems, Inc., Warrendale, PA (US)

( * ) Notice: Subject to any disclaimer, the term of this patent is extended or adjusted under 35 U.S.C. 154(b) by 0 days.

(21) Appl. No.: 09/126,975

(22) Filed: Jul. 30, 1998

(51) Int. Cl.[7] ....................................... G06F 5/00
(52) U.S. Cl. .................. 710/48; 710/60; 710/33; 710/34; 710/58; 709/233
(58) Field of Search .................. 710/48–57, 60, 710/260, 262, 263, 267–268, 129, 128, 62, 63; 709/201, 203, 217, 231, 233, 235

(56) References Cited

U.S. PATENT DOCUMENTS

| | | | |
|---|---|---|---|
| 5,068,784 | * 11/1991 | Kishino et al. | 710/100 |
| 5,586,294 | * 12/1996 | Goodwin et al. | 711/114 |
| 5,630,111 | * 5/1997 | Yoshida | 710/60 |
| 5,732,285 | * 3/1998 | Harrison et al. | 710/56 |
| 5,740,467 | * 4/1998 | Chmielecki, Jr. et al. | 710/56 |
| 5,758,191 | * 5/1998 | Kasebayashi et al. | 710/56 |
| 5,778,218 | * 7/1998 | Gulick | 710/38 |
| 5,802,153 | * 9/1998 | Sridhar et al. | 379/98 |
| 5,809,337 | * 9/1998 | Hannah et al. | 710/33 |
| 5,809,338 | * 9/1998 | Klein | 710/35 |
| 5,815,677 | * 9/1998 | Goodrum | 710/126 |
| 5,842,044 | * 11/1998 | No | 710/53 |
| 5,941,962 | * 8/1999 | Hirano | 710/53 |
| 5,978,868 | * 11/1999 | Maas | 710/52 |
| 5,983,293 | * 11/1999 | Murakami | 710/56 |
| 6,138,190 | * 10/2000 | Nording | 710/60 |

* cited by examiner

*Primary Examiner*—Robert Beausoleil
*Assistant Examiner*—Raymond N Phan
(74) *Attorney, Agent, or Firm*—Ansel M. Schwartz

(57) ABSTRACT

A system for storing data. The system includes a host for processing the data. The system includes a buffer mechanism for storing data and producing interrupt signals to the host for informing the host there is data in the buffer mechanism for the host to process. The buffer mechanism adapting the production of interrupts based on the speed the host can process data. The host is in contact with the buffer mechanism. A method for serving data. The method includes the steps of storing data in a buffer mechanism. Then there is the step of sending an initial interrupt signal to a host from the buffer mechanism informing the host there is data in the buffer mechanism for the host to process. Next there is the step of transferring data in the buffer mechanism to the host. Then there is the step of processing data from the buffer mechanism with the host. Next there is the step of adapting when a subsequent interrupt signal is sent to the host based on the speed the host can process data. Then there is the step of sending the subsequent interrupt signal to the host from the buffer mechanism when there is data in the buffer mechanism for the host to process.

18 Claims, 2 Drawing Sheets

METHOD AND APPARATUS FOR SERVING DATA WITH ADAPTABLE INTERRUPTS

FIELD OF THE INVENTION

The present invention is related to interrupt signals to alert a host that data packets are waiting for service. More specifically, the present invention is related to interrupt signals which are produced based on the speed the host can process data to alert a host that data packets are waiting for service.

BACKGROUND OF THE INVENTION

Data packets arriving from a network are usually placed into a buffer queue to be processed by a host computer. When and how often an interrupt signal needs to be generated to alert the host that there are data packets waiting in the queue is usually a compromise between latency (how long the data must wait in the queue before the host is notified) and performance (how often the host is interrupted—an interrupt can require considerable processing by the host). The existing technique of generating an interrupt for every data packet provides minimum latency but can overwhelm a slow host with a large number of interrupts.

Existing schemes generate an interrupt every packet. The card would generate an interrupt every time an end-of-packet buffer is enqueued to the host. This method provides minimum latency but can generate multiple interrupts per packet. Lots of interrupts can be generated for short packets and a slow host (worst combination).

Other existing methods use a counter or timer to limit the number of interrupts but can have latency problems especially for video or voice data. An interrupt is generated every N packet and M clock ticks from the time the last packet was enqueued. This method attempts to minimize the number of interrupt by generating an interrupt after N packets are enqueued (N is programmable). To minimize latence in case N is large, an interrupt is generated based on a timer. The timer is triggered at the end of a packet. If the timer crosses a M threshold (programmable) without detecting the end of another packet, then an interrupt is generated. Using this scheme requires the programming of two parameters: N and M. It is difficult for the host to determine the optimum value for N and M for different load conditions and variations of the host and card.

The present invention produces interrupt signals based on the speed the host can process data. The interrupt signals are sent at intervals which do not overwhelm the host and significantly effect performance.

SUMMARY OF THE INVENTION

The present invention pertains to a system for storing data. The system comprises a host for processing the data. The system comprises a buffer mechanism for storing data and producing interrupt signals to the host for informing the host there is data in the buffer mechanism for the host to process. The buffer mechanism adapting the production of interrupts based on the speed the host can process data. The host is in contact with the buffer mechanism.

The present invention pertains to a method for serving data. The method comprises the steps of storing data in a buffer mechanism. Then there is the step of sending an initial interrupt signal to a host from the buffer mechanism informing the host there is data in the buffer mechanism for the host to process. Next there is the step of transferring data in the buffer mechanism to the host. Then there is the step of processing data from the buffer mechanism with the host. Next there is the step of adapting when a subsequent interrupt signal is sent to the host based on the speed the host can process data. Then there is the step of sending the subsequent interrupt signal to the host from the buffer mechanism when there is data in the buffer mechanism for the host to process.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
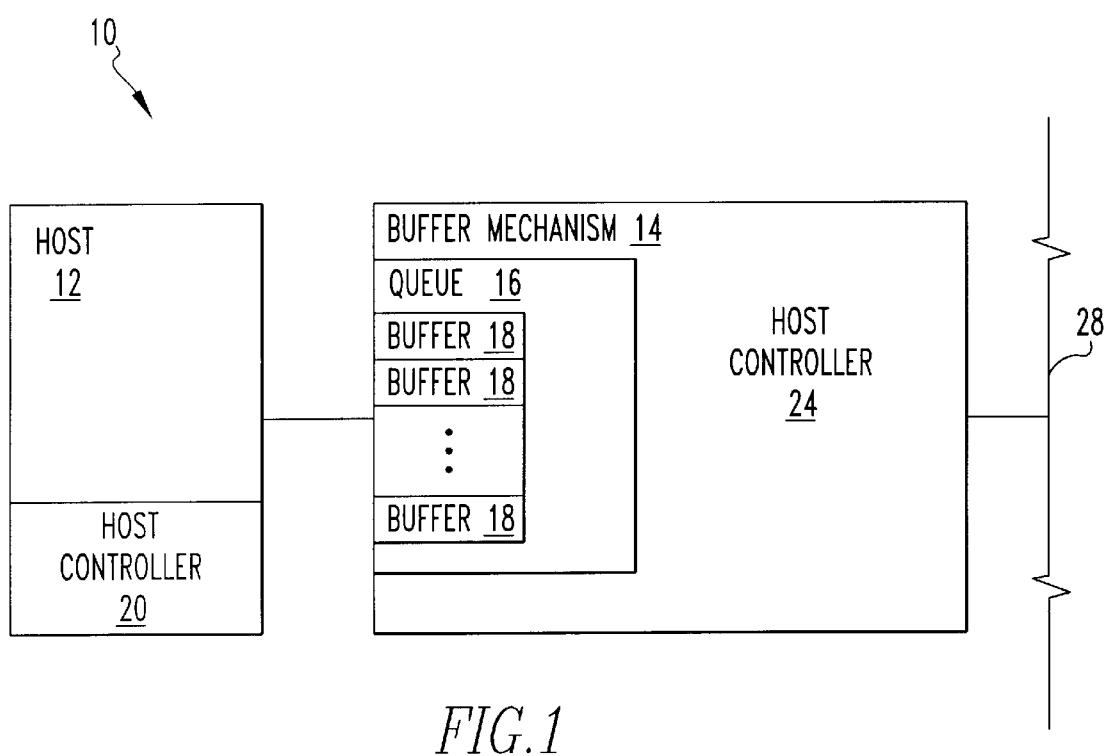
FIG. 1 is a schematic representation of a system of the present invention.
Figure 2:
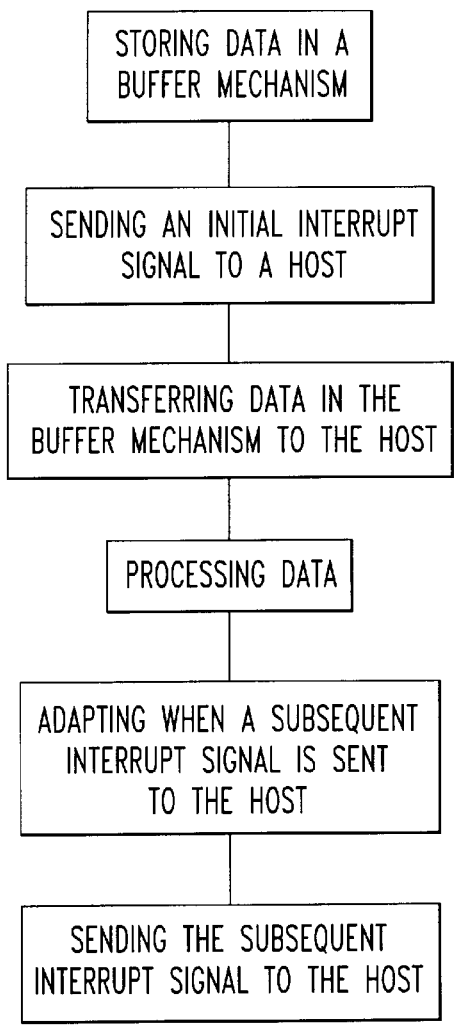
FIG. 2 is a flow chart of the present invention.

Referring now to the drawings wherein like reference numerals refer to similar or identical parts throughout the several views, and more specifically to FIG. 1 thereof, there is shown a system 10 for storing data. The system 10 comprises a host 12 for processing the data. The system 10 comprises a buffer mechanism 14 for storing data and producing interrupt signals to the host 12 for informing the host 12 there is data in the buffer mechanism 14 for the host 12 to process. The buffer mechanism 14 adapting the production of interrupts based on the speed the host 12 can process data. The host 12 is in contact with the buffer mechanism 14.

Preferably, the buffer mechanism 14 includes a queue 16 having a plurality of buffers 18 for holding data. The host 12 preferably has a host controller 20 and a host pointer 22 having a value. The host controller 20 moves the host pointer 22 to indicate which buffer of the plurality of buffers 18 was a last buffer to have data in it processed.

The buffer mechanism 14 preferably includes a buffer controller 24 and a current data pointer 26 having a value. The buffer controller 24 moves the current data pointer 26 to point at a buffer of the plurality of buffers 18 which was a last buffer to have data stored in it. Preferably, the buffer controller 24 compares the value of the host pointer 22 after it is moved to the value of the current data pointer 26 and produces an interrupt signal to the host 12 when the value of the host pointer 22 is equal to or behind the value of the current data pointer 26. The current data pointer 26 preferably points to a buffer that has an end of the packet.

Preferably, the data includes ATM cells. The system 10 preferably includes an ATM network 28 along which ATM cells travel. The buffer mechanism 14 is connected to the ATM network 28.

The present invention pertains to a method for serving data. The method comprises the steps of storing data in a buffer mechanism 14. Then there is the step of sending an initial interrupt signal to a host 12 from the buffer mechanism 14 informing the host 12 there is data in the buffer mechanism 14 for the host 12 to process. Next there is the step of transferring data in the buffer mechanism 14 to the host 12. Then there is the step of processing data from the buffer mechanism 14 with the host 12. Next there is the step of adapting when a subsequent interrupt signal is sent to the host 12 based on the speed the host 12 can process data. Then there is the step of sending the subsequent interrupt signal to the host 12 from the buffer mechanism 14 when there is data in the buffer mechanism 14 for the host 12 to process.

The buffer mechanism 14 preferably includes a queue 16 having a plurality of buffers 18 for storing the data. Preferably, after the processing step, there is the step of moving a host pointer 22 having a value to indicate the location of a last buffer of the plurality of buffers 18 whose data was processed by the host 12. The adapting step preferably includes the step of comparing the value of the host pointer 22 against a value of a current data pointer 26 in the queue 16 identifying a last buffer of the plurality of buffers 18 which last had data stored in it.

Preferably, the sending step includes the step of sending the subsequent interrupt since the value of the first host pointer 22 is equal to or behind the value of the current data pointer 26 as determined by the comparing step. Before the subsequent sending step there is preferably the step of storing additional data in the last buffer of the plurality of buffers 18. Preferably, after the additional data storing step there is the step of moving the current data pointer 26 to indicate the last buffer. Preferably, before the transferring step there is the step of detecting the first interrupt signal by a processor.

The data preferably includes ATM packets of ATM cells. Preferably, the current data pointer 26 points to an end of ATM packet.

In the operation of the preferred embodiment, an interrupt is generated on the first PDU (Packet Data Unit) received on a queue 16. A controller on a card then keeps track of a current data pointer 26 to the last PDU placed on the queue 16. The controller interrupts the host 12 again only when the host 12 has moved the host pointer 22 and the host pointer 22 is still behind the current data pointer. If the host pointer 22 has caught up or at the last current data pointer 26 then no interrupt will be generated.

Figure 3:
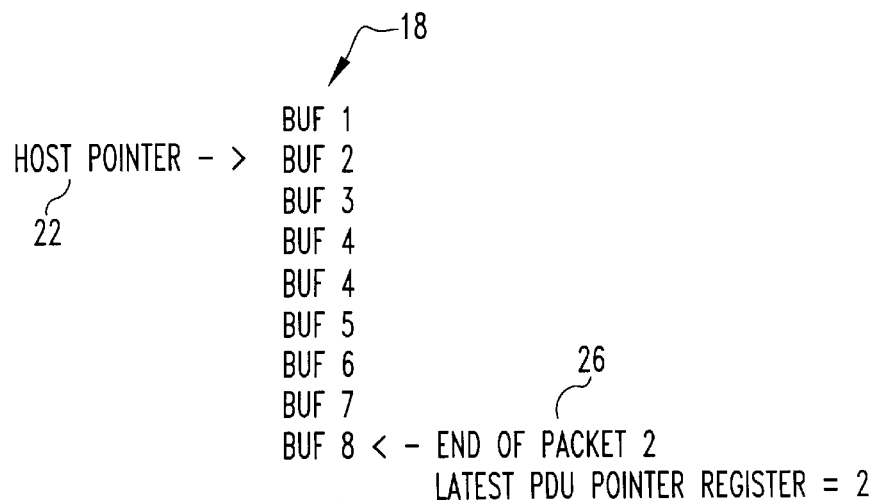
FIG. 3 is a representation of an implementation of the present invention.

Referring to FIG. 3, an interrupt is generated only in response to a movement of the host pointer 22 (indicating that the host 12 has processed the queue 16 up to the point to which it is moved). In FIG. 3, if the host 12 moves its pointer 22 to buffer 8, then no interrupt will be generated (no pending buffer in the queue 16 since buffer 8 is at the bottom of the queue 16 and no buffers 18 follow buffer 8). If the host 12 only moves its pointer 22 to any buffer between 3 and 7, then an interrupt will be generated (there are pending buffers 18 existing in the queue 16 below the buffer at which the host pointer 22 points). If the host 12 does not move its pointer 22 at all, then no interrupt will be generated (no need to overload a slow host 12 with more interrupts).

This provides for the minimum latency possible (equivalent to a single packet interrupt scheme), but also minimizes the number of interrupts generated. This is because more than one and possibly many buffers 18 are processed following each interrupt, the host 12 is not interrupted for each buffer to be told each respective buffer has data for processing. Nor does the host's performance suffer just due to the time lost as the interrupt signals and host 12 response signals go back and forth between the card and the host 12 to communicate therebetween so data can be transferred. This takes up bandwidth which otherwise could be devoted to transferring data from the card. In the worst case, if the host 12 is very fast, this generates an interrupt for every packet—never more than one interrupt per packet. The rate of interrupt adapts to the speed at which the host 12 can service the queue 16 since the host 12 only moves its host pointer 22 when it is ready to move it.

In all the schemes described above, there is an additional condition that can generate an interrupt. An interrupt is generated if the number of buffers 18 pending in the queue 16 reaches a high threshold. This is needed to prevent overflowing the queue 16 in the case of a very large packet (the queue 16 is almost full, but the end of the packet is not yet received).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for serving data comprising the steps of:
   storing data in a buffer mechanism;
   sending an initial interrupt signal to a host from the buffer mechanism informing the host there is data in the buffer mechanism for the host to process;
   transferring data in the buffer mechanism to the host;
   processing data from the buffer mechanism with the host;
   adapting when a subsequent interrupt signal is sent to the host based on the speed the host can process data; and
   sending the subsequent interrupt signal to the host from the buffer mechanism when there is data in the buffer mechanism for the host to process.

2. A method as described in claim 1 wherein the buffer mechanism includes a queue having a plurality of buffers for storing the data.

3. A method as described in claim 2 including after the processing step, there is the step of moving a host pointer having a value to indicate a location of a last buffer of the plurality of buffers whose data was processed by the host.

4. A method as described in claim 3 wherein the adapting step includes the step of comparing the value of the host pointer against a value of a current data pointer in the queue identifying a last buffer of the plurality of buffers which last had data stored in it.

5. A method as described in claim 4 wherein the sending step includes the step of sending the subsequent interrupt since the value of the host pointer is equal to or behind the value of the current data pointer as determined by the comparing step.

6. A method as described in claim 5 including before the subsequent sending step there is the step of storing additional data in the last buffer of the plurality of buffers.

7. A method as described in claim 6 including after the additional data storing step there is the step of moving the current data pointer to indicate the last buffer.

8. A method as described in claim 7 wherein the data includes ATM cells.

9. A method as described in claim 8 wherein before the transferring step there is the step of detecting the initial interrupt signal by a processor.

10. A method as described in claim 9 wherein the current data pointer points to an end of ATM packet.

11. A system for storing data comprising:
    a host for processing the data; and
    a buffer mechanism for storing data and producing interrupt signals to the host for informing the host there is data in the buffer mechanism for the host to process, said buffer mechanism adapting the production of interrupts based on the speed the host can process data, said host in contact with said buffer mechanism.

12. A system as described in claim 11 wherein the buffer mechanism includes a queue having a plurality of buffers for holding data.

13. A system as described in claim 12 wherein the host has a host controller and a host pointer having a value, said host controller moving the host pointer to indicate which buffer of the plurality of buffers was a last buffer to have data in it processed.

14. A system as described in claim 13 wherein the buffer mechanism includes a buffer controller and a current data pointer having a value, said buffer controller moving said current data pointer to point at a buffer of the plurality of buffers which was a last buffer to have data stored in it.

15. A system as described in claim 14 wherein the buffer controller compares the value of the host pointer after it is moved to the value of the current data pointer and produces an interrupt signal to the host when the value of the host pointer is equal to or behind the value of the current data pointer.

16. A system as described in claim 15 wherein the data includes ATM cells.

17. A system as described in claim 16 wherein the ATM cells are of a packet and the current data pointer points to a buffer that has an end of the packet.

18. A system as described in claim 17 including an ATM network along which ATM cells travel, said buffer mechanism connected to the ATM network.

* * * * *